United States Patent
Huang et al.

(10) Patent No.: US 10,548,070 B2
(45) Date of Patent: Jan. 28, 2020

(54) APPARATUS, SYSTEM AND METHOD OF COMMUNICATING IN A NEIGHBOR AWARENESS NETWORKING CLUSTER

(71) Applicant: INTEL IP CORPORATION, Santa Clara, CA (US)

(72) Inventors: Po-Kai Huang, San Jose, CA (US); Emily H. Qi, Gig Harbor, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 44 days.

(21) Appl. No.: 15/837,186

(22) Filed: Dec. 11, 2017

(65) Prior Publication Data

US 2018/0176857 A1 Jun. 21, 2018

Related U.S. Application Data

(63) Continuation of application No. 14/748,251, filed on Jun. 24, 2015, now Pat. No. 9,872,234.
(Continued)

(51) Int. Cl.
*H04W 48/16* (2009.01)
*H04W 4/08* (2009.01)
(Continued)

(52) U.S. Cl.
CPC ............. *H04W 48/16* (2013.01); *H04L 67/16* (2013.01); *H04W 72/121* (2013.01); *H04W 4/06* (2013.01); *H04W 8/005* (2013.01)

(58) Field of Classification Search
CPC ........ H04L 67/16; H04W 48/16; H04W 4/06; H04W 72/121; H04W 72/1257; H04W 8/005
See application file for complete search history.

(56) References Cited

U.S. PATENT DOCUMENTS

| 9,313,641 B2 | 4/2016 | Abraham et al. |
| 9,544,754 B1 * | 1/2017 | Lambert ............... H04W 8/005 |

(Continued)

FOREIGN PATENT DOCUMENTS

EP 2835915 2/2015

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Ahmed Elallam
(74) *Attorney, Agent, or Firm* — Shichrur & Co.

(57) ABSTRACT

Some demonstrative embodiments include apparatuses, systems and/or methods of communicating in an awareness cluster. For example, an apparatus may include circuitry configured to cause an awareness networking device to communicate during one or more Discovery Windows (DW) of an awareness cluster; communicate with one or more devices of at least one data path group, the data path group comprising devices of the awareness cluster and having a common schedule of radio resources (SRR); and communicate with one or more devices of at least one service data group, the service data group comprising devices of the data path group being subscribed to a common service.

25 Claims, 6 Drawing Sheets

Related U.S. Application Data

(60) Provisional application No. 62/115,277, filed on Feb. 12, 2015.

(51) Int. Cl.
| | |
|---|---|
| *H04W 72/04* | (2009.01) |
| *H04W 16/04* | (2009.01) |
| *H04W 72/12* | (2009.01) |
| *H04W 4/06* | (2009.01) |
| *H04W 8/00* | (2009.01) |
| *H04L 29/08* | (2006.01) |

(56) References Cited

U.S. PATENT DOCUMENTS

| | | | |
|---|---|---|---|
| 9,872,234 | B2 | 1/2018 | Huang et al. |
| 9,998,535 | B2 * | 6/2018 | Liu .................. H04L 29/08072 |
| 10,098,168 | B2 * | 10/2018 | Liu ........................ H04L 67/104 |
| 2009/0157814 | A1 | 6/2009 | Lee et al. |
| 2014/0086134 | A1 | 3/2014 | Smadi et al. |
| 2014/0254569 | A1 | 9/2014 | Abraham et al. |
| 2014/0269555 | A1 | 9/2014 | Sadasivam et al. |
| 2014/0269658 | A1 | 9/2014 | Sadasivam et al. |
| 2014/0301552 | A1 | 10/2014 | Yi et al. |
| 2014/0313966 | A1 * | 10/2014 | Shukla .................. H04W 48/10 370/312 |
| 2014/0321317 | A1 | 10/2014 | Kasslin et al. |
| 2014/0328168 | A1 | 11/2014 | Park et al. |
| 2015/0023342 | A1 | 1/2015 | Joo |
| 2015/0036540 | A1 | 2/2015 | Kasslin et al. |
| 2015/0081840 | A1 | 3/2015 | Patil et al. |
| 2015/0098388 | A1 | 4/2015 | Fang et al. |
| 2015/0172902 | A1 | 6/2015 | Kasslin et al. |
| 2015/0200811 | A1 | 7/2015 | Kasslin et al. |
| 2015/0296458 | A1 | 10/2015 | Abraham et al. |
| 2015/0350027 | A1 | 12/2015 | Raissinia et al. |
| 2015/0350866 | A1 | 12/2015 | Patil et al. |
| 2015/0350906 | A1 | 12/2015 | Patil et al. |
| 2016/0073288 | A1 * | 3/2016 | Patil ...................... H04W 74/08 370/230 |
| 2016/0353368 | A1 * | 12/2016 | Fang ...................... H04W 48/16 |
| 2017/0006562 | A1 | 1/2017 | Kim et al. |
| 2017/0325092 | A1 * | 11/2017 | Kneckt ................. H04W 76/14 |

OTHER PUBLICATIONS

Wi-Fi Alliance, Wi-Fi Peer-to-Peer (P2P) Technical Specification Version 1.5, Aug. 4, 2014, 183 pages.
International Search Report and Written Opinion for PCT/US2016/012957, dated May 30, 2016, 11 pages.
Office Action for U.S. Appl. No. 14/748,251, dated Mar. 15, 2017, 18 pages.
Notice of Allowance for U.S. Appl. No. 14/748,251, dated Sep. 11, 2017, 9 pages.
International Preliminary Report on Patentability for PCT/US2016/012957, dated Aug. 24, 2017, 8 pages.
European Search Report for European Patent Application No. 16749560.5, dated Aug. 17, 2018, 7 pages.

* cited by examiner

APPARATUS, SYSTEM AND METHOD OF COMMUNICATING IN A NEIGHBOR AWARENESS NETWORKING CLUSTER

CROSS REFERENCE

This application claims the benefit of and priority from U.S. Provisional Patent Application No. 62/115,277 entitled "Apparatus, System and Method of Communicating in An Awareness Cluster", filed Feb. 12, 2015, the entire disclosure of which is incorporated herein by reference.

TECHNICAL FIELD

Embodiments described herein generally relate to communicating in an awareness cluster.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
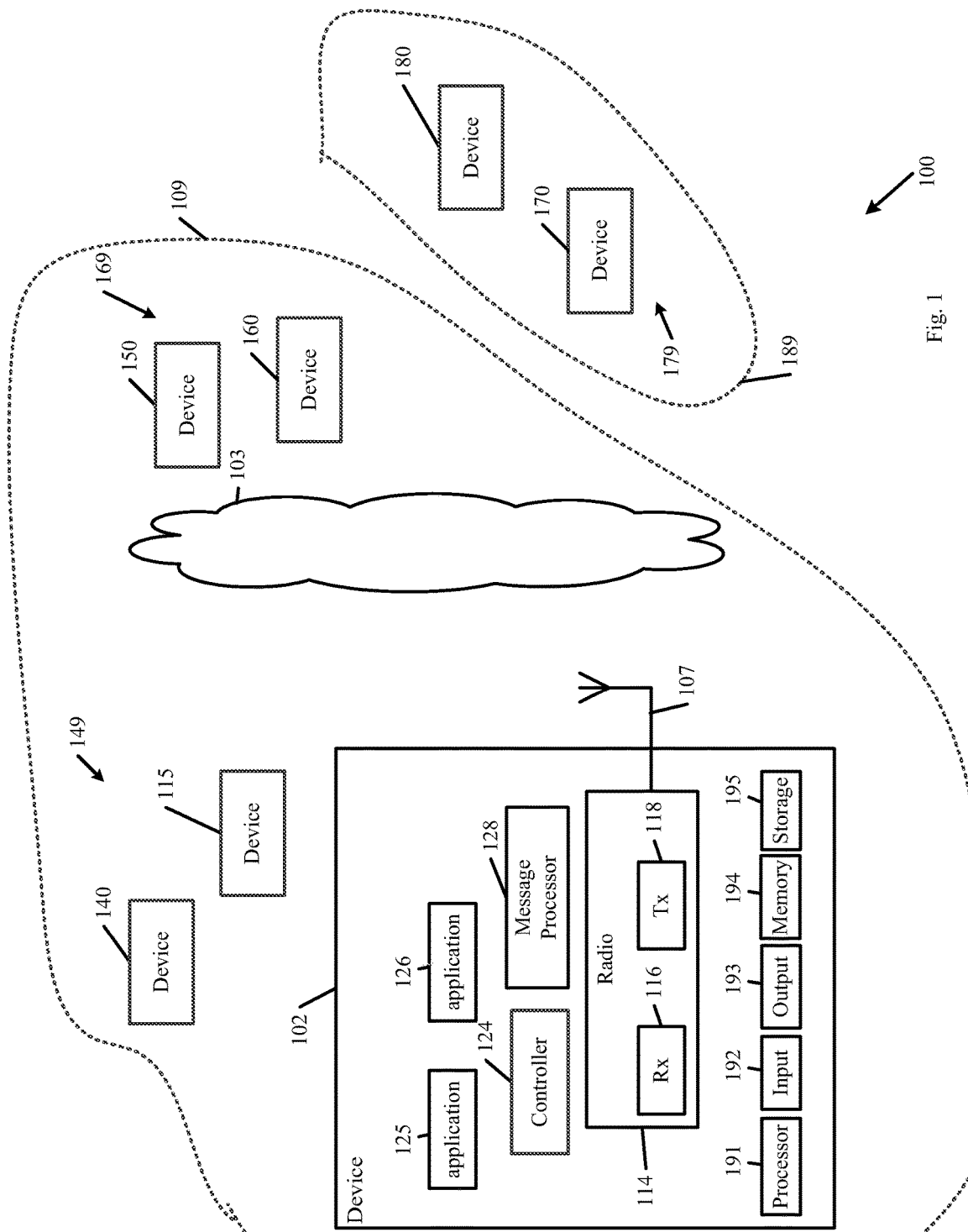
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version 1.0, May 1, 2015*) and/or future versions and/or derivatives thereof, devices and/or networks operating in accordance with existing WFA Peer-to-Peer (P2P) specifications (*WiFi P2P technical specification, version 1.5, Aug. 4, 2014*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz*

Band", 28 Dec., 2012); and/or IEEE-802.11REVmc ("*IEEE 802.11—REVmc™/D3.0, June* 2014 *draft standard for Information exchange between systems Local and metropolitan area networks Specific requirements; Part* 11: *Wireless LAN Medium Access Control* (*MAC*) *and Physical Layer* (*PHY*) *Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 115, 140, 150, 160, 170 and/or 180.

In some demonstrative embodiments, wireless communication devices 102, 115, 140, 150, 160, 170 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, one or more devices of wireless communication devices 102, 115, 140, 150, 160, 170 and/or 180, e.g., device 140, may include, or may perform the functionality of, an Access Point (AP), e.g., as described below.

For example, the AP may include a router, a PC, a server, a Hot-Spot and/or the like.

In some demonstrative embodiments, one or more devices of wireless communication devices 102, 115, 140, 150, 160, 170 and/or 180, e.g., device 102, may perform the functionality of a non-AP STA, and/or device 140 may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, devices 102, 115, 140, 150, 160, 170 and/or 180 may include, for example, one or more of a processor 191, an input unit 192, an output unit 193, a memory unit 194, and/or a storage unit 195. Devices 102, 115, 140, 150, 160, 170 and/or 180 may optionally include other suitable hardware components and/or software components. In some demonstrative embodiments, some or all of the components of devices 102, 115, 140, 150, 160, 170 and/or 180 may be enclosed in a common housing or packaging, and may be interconnected or operably associated using one or more wired or wireless links. In other embodiments, components of devices 102, 115, 140, 150, 160, 170 and/or 180 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, Input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 115, 140, 150, 160, 170 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 115, 140, 150, 160, 170 and/or 180 may include one or more radios including circuitry and/or logic to perform wireless communication between devices 102, 115, 140, 150, 160, 170, 180 and/or one or more other wireless communication devices. For example, devices 102, 115, 140, 150, 160, 170 and/or 180 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include a receiver 116.

In some demonstrative embodiments, radio 114 may include one or more wireless transmitters (Tx) including circuitry and/or logic to send wireless communication signals, RF signals, frames, blocks, transmission streams, packets, messages, data items, and/or data. For example, radio 114 may include a transmitter 118.

In some demonstrative embodiments, radio 114 may be configured to communicate over a 2.4 GHz band, a 5 GHz band, a mmWave band, a S1G band, and/or any other band.

In some demonstrative embodiments, radio 114 may include circuitry and/or logic, modulation elements, demodulation elements, amplifiers, analog to digital and digital to analog converters, filters, and/or the like. In one example, radio 114 may include or may be implemented as part of a wireless Network Interface Card (NIC), and the like.

In some demonstrative embodiments, radio 114 may include, or may be associated with, one or more antennas 107.

In one example, device 102 may include a single antenna 107. In other example, device 102 may include two or more antennas 107.

Antennas 107 may include any type of antennas suitable to transmit and/or receive wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication devices 102, 115, 140, 150, 160, 170 and/or 180 may form, and/or may communicate as part of, a wireless local area network (WLAN).

In some demonstrative embodiments, wireless communication devices 102, 115, 140, 150, 160, 170 and/or 180 may form, and/or may communicate as part of, a WiFi network.

In some demonstrative embodiments, wireless communication devices 102, 115, 140, 150, 160, 170 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 115, 140, 150, 160, 170 and/or 180 may include, or may perform the functionality of a WiFi Direct device.

In some demonstrative embodiments, wireless communication devices 102, 115, 140, 150, 160, 170 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 115, 140, 150, 160, 170 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 115, 140, 150, 160, 170 and/or 180.

In some demonstrative embodiments, wireless communication devices 102, 115, 140, 150, 160, 170 and/or 180 may perform the functionality of WFD P2P devices. For example, devices 102, 115, 140, 150, 160, 170 and/or 180 may be able to perform the functionality of a P2P client device, and/or P2P group Owner (GO) device.

In other embodiments, wireless communication devices 102, 115, 140, 150, 160, 170 and/or 180 may form, and/or communicate as part of, any other network and/or perform the functionality of any other wireless devices or stations.

In some demonstrative embodiments, devices 102, 115, 140, 150, 160, 170 and/or 180 may include one or more applications configured to provide, share, and/or to use one or more services, e.g., a social application, a file sharing application, a media application and/or the like, for example, using an awareness network, NAN network ("WiFi Aware network"), a PTP network, a P2P network, WFD network, or any other network.

In some demonstrative embodiments, device 102 may execute an application 125 and/or an application 126.

In some demonstrative embodiments, devices 102, 115, 140, 150, 160, 170 and/or 180 may be capable of sharing, showing, sending, transferring, printing, outputting, providing, synchronizing, and/or exchanging content, data, and/or information, e.g., between applications and/or services of devices 102, 115, 140, 150, 160, 170 and/or 180 and/or one or more other devices.

In some demonstrative embodiments, devices 102, 115, 140, 150, 160, 170 and/or 180 may include a controller configured to control one or more functionalities of devices 102, 115, 140, 150, 160, 170 and/or 180, for example, one or more functionalities of communication, e.g., awareness networking communications, WiFi Aware (NAN) communication and/or any other communication, between devices 102, 115, 140, 150, 160, 170 and/or 180 and/or other devices, and/or any other functionality, e.g., as described below. For example, device 102 may include a controller 124.

In some demonstrative embodiments, controller 124 may be configured to perform one or more functionalities, communications, operations and/or procedures between wireless communication devices 102, 115, 140, 150, 160, 170 and/or 180, and/or one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 115, 140, 150, 160, 170 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, message processor 128 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In one example, message processor 128 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, devices 102, 115, 140, 150, 160, 170 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radio 114 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 115, 140, 150, 160, 170 and/or 180, may include one or more blocks and/or entities to perform network awareness functionality. For example, a device, e.g., devices 102, 115, 140, 150, 160, 170 and/or 180, performing the functionality of a NAN device, may include a NAN MAC and/or a Discovery Engine (DE). In one example, controller 124 may be configured to perform the functionality of the discovery engine, and/or message processor 128 may be configured to perform the functionality of the NAN MAC, e.g., as described above. In another example, the functionality of the NAN MAC and/or the Discovery engine may be performed by any other element and/or entity of devices 102, 115, 140, 150, 160, 170 and/or 180.

In some demonstrative embodiments, the awareness networking scheme may include a discovery scheme or protocol, e.g., as described below.

In some demonstrative embodiments, devices 102, 115, 140, 150, 160, 170 and/or 180 may perform a discovery process according to the awareness networking scheme, for example, to discover each other and/or to establish a wireless communication link, e.g., directional and/or high throughput wireless communication link and/or any other link.

In some demonstrative embodiments, devices 102, 115, 140, 150, 160, 170 and/or 180 may be configured to enable time synchronization between devices 102, 115, 140, 150, 160, 170, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 115, 140, 150, 160, 170 and/or 180, so that STAs can find each other more efficiently during a DW.

In some demonstrative embodiments, devices of an awareness network, e.g. a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 115, 140, 150, 160, 170 and/or 180, e.g., device 102, may perform the functionality of an AM. The AM may be configured to transmit one or more beacons. Another one of devices 102, 115, 140, 150, 160, 170 and/or 180, e.g., device 140, may be configured to receive and process the beacons.

In one example, devices 102, 115, 140, 150, 160, 170 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 115, 140, 150, 160, 170 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 115, 140, 150, 160, 170 and/or 180 may transmit discovery frames, e.g., SDFs, during the plurality of DWs, e.g., over the social channel. For example the NAN AM may advertize the time of the DW, during which NAN devices may exchange SDFs.

In one example, devices 102, 115, 140, 150, 160, 170 and/or 180 may transmit the discovery frames to discover each other, for example, to enable using the one or more services provided by applications 125 and/or 126.

In some demonstrative embodiments, devices 102, 115, 140, 150, 160, 170 and/or 180 may communicate during a DW according to a contention mechanism. For example, devices 102, 115, 140, 150, 160, 170 and/or 180 may check whether or not a channel is unoccupied prior to an attempt to transmit a discovery frame during the discovery window.

In some demonstrative embodiments, a device of devices 102, 115, 140, 150, 160, 170 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 115, 140, 150, 160, 170 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability attribute is to awake and available to send and/or receive data in a specified method.

In some demonstrative embodiments, devices 102, 115, 140, 150, 160, 170 and/or 180 may be part of an awareness cluster, e.g., a NAN cluster.

In some demonstrative embodiments, devices 102, 115, 140, 150, 160, 170 and/or 180 may be configured to enable data transmission for a service among multiple devices, for example, using at least one data path group, e.g., an awareness data path group, for example, a Wi-Fi Aware data path, e.g., after service discovery.

In some demonstrative embodiments, devices 102, 115, 140, 150, 160, 170 and/or 180 may be configured to enable construction of at least one data path group, for example, based on constraints of security, medium efficiency, and/or any other constraint, criterion and/or requirement. In one example, a service may require secure data transmission, and/or a device that subscribes to different services may need to efficiently transmit and receive the data related to the different services.

In some demonstrative embodiments, devices 102, 115, 140, 150, 160, 170 and/or 180 may be configured to communicate according to a network architecture, which may include at least one data path group, which may be, for example, under the framework of the awareness cluster, e.g., a Wi-Fi Aware cluster, for example, to enable to address the issues of security and/or efficiency, and/or any other issues.

In one example, devices 102, 115, 140, 150, and/or 160 may be part of a data path group 109 within the awareness cluster, for example, having a first common or shared Schedule of Radio Resources (SRR), e.g., as described below.

In another example, devices 170 and/or 180 may be part of a data path group 189 within the awareness cluster, for example, having a second common or shared SRR, e.g., as described below.

In some demonstrative embodiments, devices of the awareness cluster, e.g., including devices 102, 115, 140, 150, 160, 170 and/or 180, may be divided into at least two layers, for example, a data path group layer, and a service data group layer, e.g., as described below.

In some demonstrative embodiments, the phrases "data path group" and/or "service data group" may be used herein to provide a high-level concept of the network architecture. Any additional or alternative names, terms or phrases may be used with respect to these concepts.

In one example, the data path group layer may include data path group 109, e.g., including devices 102, 115, 140, 150, and/or 160; and data path group 189, e.g., including devices 170 and/or 189.

In some demonstrative embodiments, devices of the awareness cluster, e.g., including devices 102, 115, 140, 150, 160, 170 and/or 180, may belong to at least one service data group.

In one example, the service data group layer may include a service data group 149, e.g., including devices 102, 115 and/or 140; a service data group 169, e.g., including devices 102, 150 and/or 160; and/or a service data group 179, e.g., including devices 170 and 180.

In some demonstrative embodiments, a service data group may include devices subscribed to a common service and/or application.

In some demonstrative embodiments, at least one service data group, e.g., service data groups 149 and/or 169 may belong to the same data path group, e.g., data path group 109.

Figure 2:
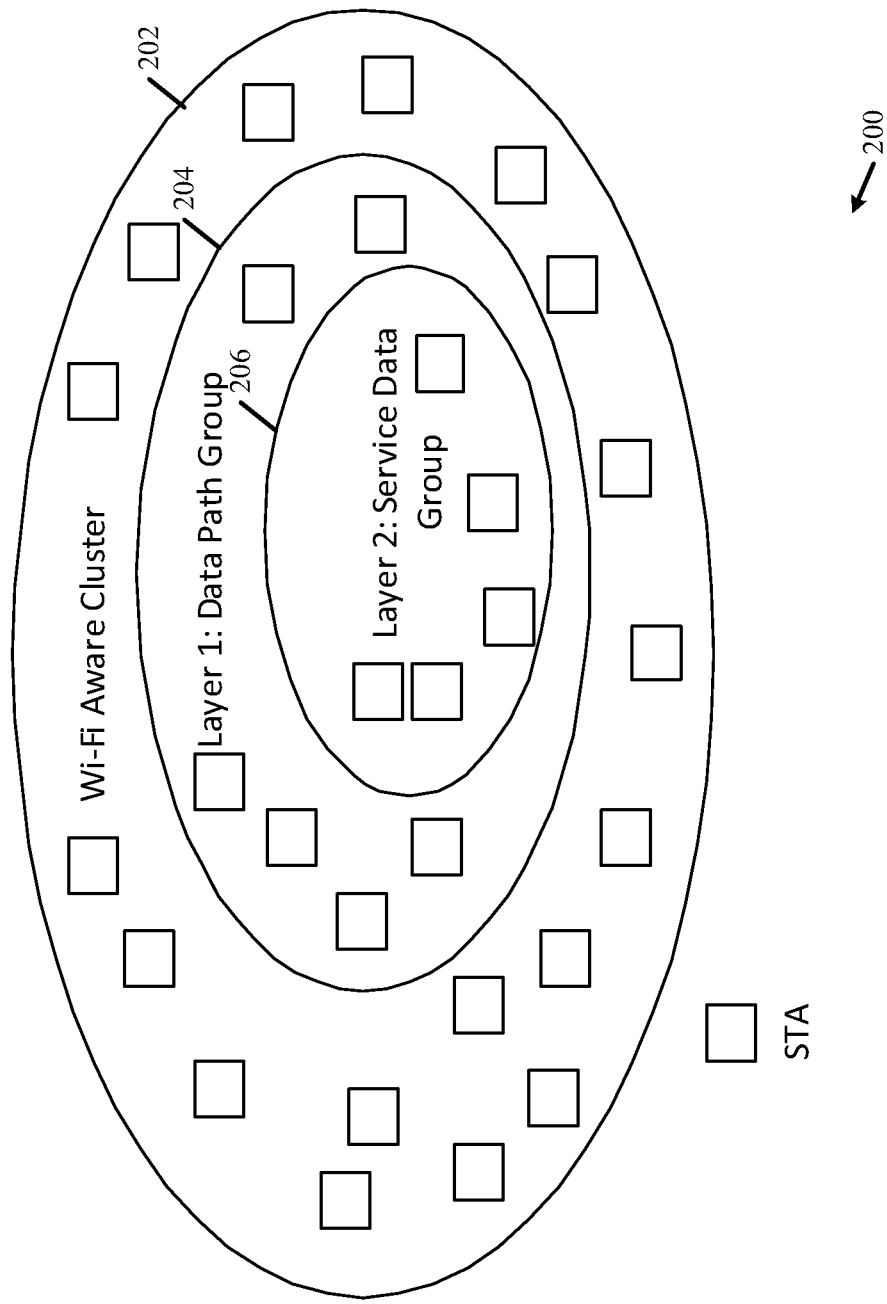
FIG. 2 is a schematic illustration of a network architecture, in accordance with some demonstrative embodiments.

Reference is made to FIG. 2, which schematically illustrates a network architecture 200, in accordance with some demonstrative embodiments.

As shown in FIG. 2, network architecture may include an awareness cluster 202 including a plurality of devices. For example, awareness cluster 202 may include devices 102, 115, 140, 150, 160, 170 and/or 180 (FIG. 1).

As shown in FIG. 2, at least one data path group 204 may be formed by one or more devices of the plurality of devices of awareness cluster 202. For example, data path group may perform the functionality of data path group 109 (FIG. 1).

As shown in FIG. 2, at least one service data group 206 may be formed by devices of data path group 204. For example, service data group 206 may perform the functionality of service data group 149 (FIG. 1).

In some demonstrative embodiments, the network architecture 200 including the data path group 204, e.g., formed under the awareness cluster 202, and/or the service data group 206, e.g., formed under the data path group 204, may enable to provide, for example, at least increased medium efficiency, and/or a secure data path, e.g., as described below.

In some demonstrative embodiments, data path group 204 may include devices with a common Schedule of Radio Resources (SRR), for example, the same time schedule and/or frequency hopping schedule, e.g., in a period of a pattern repetition.

In one example, the availability information of a device may represent the SRR of the device. The SRR may be represented, defined, and/or determined in any other manner.

In some demonstrative embodiments, devices with the same SRR may form, and/or may be part of, data path group 204.

In some demonstrative embodiments, forming of data path group 204 may enable, for example, to improve efficiency of medium access, for example, such that a channel switching delay and/or an awake time may be reduced, e.g., minimized.

In some demonstrative embodiments, the period of pattern repetition may include, for example, a period of a Discovery Window in the awareness cluster, e.g., a period of a DW in a Wi-Fi Aware cluster.

In some demonstrative embodiments, service data group 206 may be defined with respect to devices that subscribe to the same service.

In some demonstrative embodiments, a plurality of devices that subscribe to the same service may form service data group 206.

In some demonstrative embodiments, service data group 206 may enable, for example, to provide a service access policy, e.g. security, for a service.

In some demonstrative embodiments, forming of service data group 206 within data path group 204 may enable devices of service data group 206 to share a common SRR, e.g., the SRR of data path group 204.

In some demonstrative embodiments, sharing the common SRR, e.g., by devices of service data group 206, may enable, for example, an efficient communication of a device and/or an efficient utilization of the medium by the device, e.g., as described below with reference to FIGS. 3 and/or 4.

Figure 3:
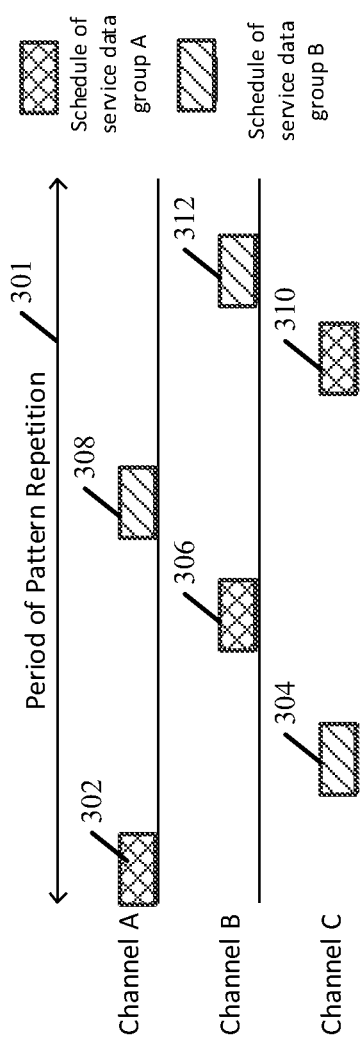
FIG. 3 is a schematic illustration of timing and frequency schedules of first and second service data groups, in accordance with some demonstrative embodiments.

Reference is made to FIG. 3, which schematically illustrates timing and frequency schedules of a first service data group (group A) and a second service data group (group B), in accordance with some demonstrative embodiments. For example, group A may perform the functionality of service data group 206 (FIG. 2), and/or service data group 149 (FIG. 1); and/or group B may perform the functionality of service data group 179 (FIG. 1).

In some demonstrative embodiments, service data group A and service data group B may follow different schedules, e.g., having different timing and/or frequency hopping patterns for example, if service data group A and service data group B are assigned to different data path groups.

In one example, service data group A may share a first common SRR and service data group B may share a second, e.g., different, SRR, for example, if service data group A is within data path group 109 (FIG. 1), and/or service data group B is within data path group 189 (FIG. 1).

As shown in FIG. 3, as a result of the different schedules of service data group A and service data group B, a device belonging to both of the service data groups A and B may be required to switch channels six times in a period of pattern repetition 301, for example, if the service data groups A and B communicate according to different SRRs over three channels, e.g., channel A, channel B and channel C.

For example, as shown in FIG. 3, during the period of pattern repetition 301, the device may be required to communicate over channel A with service data group A during a time period 302; the device may be required to switch from channel A to channel C, e.g., to communicate over channel C with service data group B during a time period 304; the device may be required to switch from channel C to channel B, e.g., to communicate over channel B with service data group A during a time period 306; the device may be required to switch from channel B to channel A, e.g., to communicate over channel A with service data group B during a time period 308; the device may be required to switch from channel A to channel C, e.g., to communicate over channel C with service data group A during a time period 310; the device may be required to switch from channel C to channel B, e.g., to communicate over channel B with service data group B during a time period 312; and/or the device may be required to switch from channel B to channel A, e.g., to communicate over channel A with service data group A during a first time period of a subsequent period of pattern repetition.

In some demonstrative embodiments, this increased rate of channel switching may not enable an efficient communication of the device and/or an efficient utilization of the medium.

Figure 4:
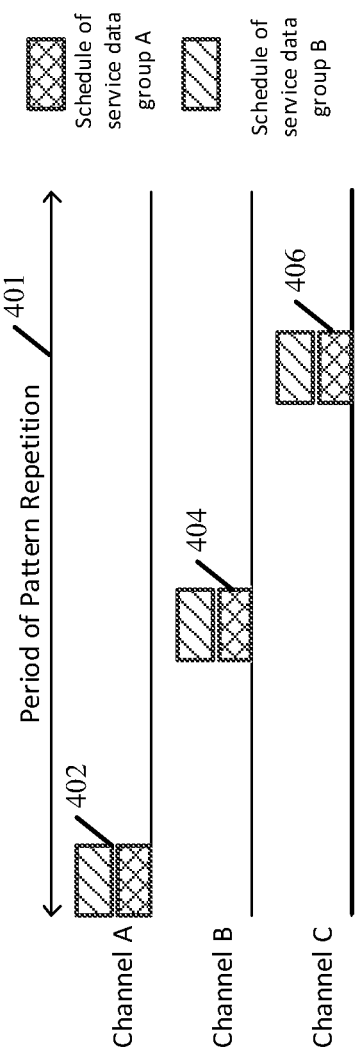
FIG. 4 is a schematic illustration of timing and frequency schedules of first and second service data groups, in accordance with some demonstrative embodiments.

Reference is made to FIG. 4, which schematically illustrates timing and frequency schedules of a first service data group (group A) and a second service data group (group B), in accordance with some demonstrative embodiments. For example, group A may perform the functionality of service data group 206 (FIG. 2), and/or service data group 149 (FIG. 1); and/or group B may perform the functionality of service data group 169 (FIG. 1).

In some demonstrative embodiments, service data group A and service data group B may follow the same schedule, e.g., having the same timing and frequency hopping patterns, for example, if service data group A and service data group B are assigned to the same data path group.

In one example, both service data group A and service data group B may share the same common SRR, for example, if service data groups A and B assigned to the same data path group 109 (FIG. 1).

As shown in FIG. 4, a device belonging to both the service data group A and the service data group B may be required to switch channels only 3 times in a period of pattern repetition 401.

For example, as shown in FIG. 4, during the period of pattern repetition 401, the device may communicate over channel A with both service data groups A and B during a time period 402; to the device may switch from channel A to channel B, e.g., to communicate over channel B with both service data groups A and B during a time period 404; the device may switch from channel B to channel C, e.g., to communicate over channel C with both service data groups A and B during a time period 406; and/or the device may switch from channel C to channel A, e.g., to communicate over channel A with both service data groups A and B during a first time period of a subsequent period of pattern repetition.

In some demonstrative embodiments, this reduced rate of channel switching may enable an efficient communication of the device and/or an efficient utilization of the medium, e.g., compared to the channel switching of FIG. 3.

Referring back to FIG. 1, some demonstrative embodiments may enable devices in a service data group to share a common SRR, e.g., an SRR of the data path group including the devices of the service path group.

In one example, devices 102, 115, and/or 140 of service data group 149 may share an SRR of data path group 109.

In some demonstrative embodiments, device 102 may communicate during one or more Discovery Windows (DW) of the awareness cluster including wireless communication devices 102, 115, 140, 150, 160, 170 and/or 180.

In some demonstrative embodiments, device 102 may communicate with one or more devices of at least one data path group 109. For example, device 102 may communicate with devices 115, 140, 150, and/or 160.

In some demonstrative embodiments, the data path group 109 may include devices of the awareness cluster, which may have a common SRR.

In some demonstrative embodiments, the common SRR may include timing and channel resources, e.g., as described above.

In some demonstrative embodiments, device 102 may be configured to communicate with the devices of the service data group 149 according to a security policy. For example, device 102 may communicate with devices 115 and/or 140 according to a security policy of application 125.

In some demonstrative embodiments, device 102 may be configured to communicate with the devices of the service data group 149 according to an access policy. For example, device 102 may communicate with devices 115 and/or 140 according to an access policy of application 125.

In some demonstrative embodiments, device 102 may communicate with one or more devices of the at least one service data group 149.

In some demonstrative embodiments, service data group 149 may include devices of data path group 109 being subscribed to a common service. For example, service data group 149 may include devices 102, 115 and 140, which may have subscribed to application 125.

In some demonstrative embodiments, device 102 may communicate with devices of a plurality of service data groups within the data path group 109.

In some demonstrative embodiments, the plurality of service data groups may share the common SRR, e.g., the SRR of data path group 109. For example, device 102 may communicate with devices 150 and/or 160 of service data group 169, e.g., within data path group 109.

In some demonstrative embodiments, device 102 may communicate with devices of a plurality of data path groups belonging to the awareness cluster. For example, device 102 may communicate with devices 170 and/or 180 of data path group 189, which belong to the awareness cluster, e.g., including wireless communication devices 102, 115, 140, 150, 160, 170 and/or 180.

In some demonstrative embodiments, device 102 may be configured to join the service data group 149.

In one example, device 140 may form service data group 149 including devices 115 and 140, for example, to share an application on device 140. According to this example, device 102 may be configured to join the service data group 149, for example, to share and/or to utilize an application on device 140.

In some demonstrative embodiments, device 102 may be configured to form the service data group 149.

In one example, device 102 may form service data group 149 including devices 102, 115 and/or 140, for example, to share application 126 on device 102 between devices 102, 115 and/or 140.

In some demonstrative embodiments, device 102 may be configured to form a data path group including the service data group.

In one example, device 102 may form a data path group including service data group 149, e.g. including devices 102, 115 and/or 140, for example, to share application 126 between devices 102, 115 and/or 140, e.g., using a common SRR.

In some demonstrative embodiments, device 102 may be configured to form service data group 149 in an existing data path group.

In one example, device 140 may form data path group 109 including devices 102, 115, 140, 150 and/or 160, and device 102 may form service data group 149, e.g., after data path group 109 is formed.

Figure 5:
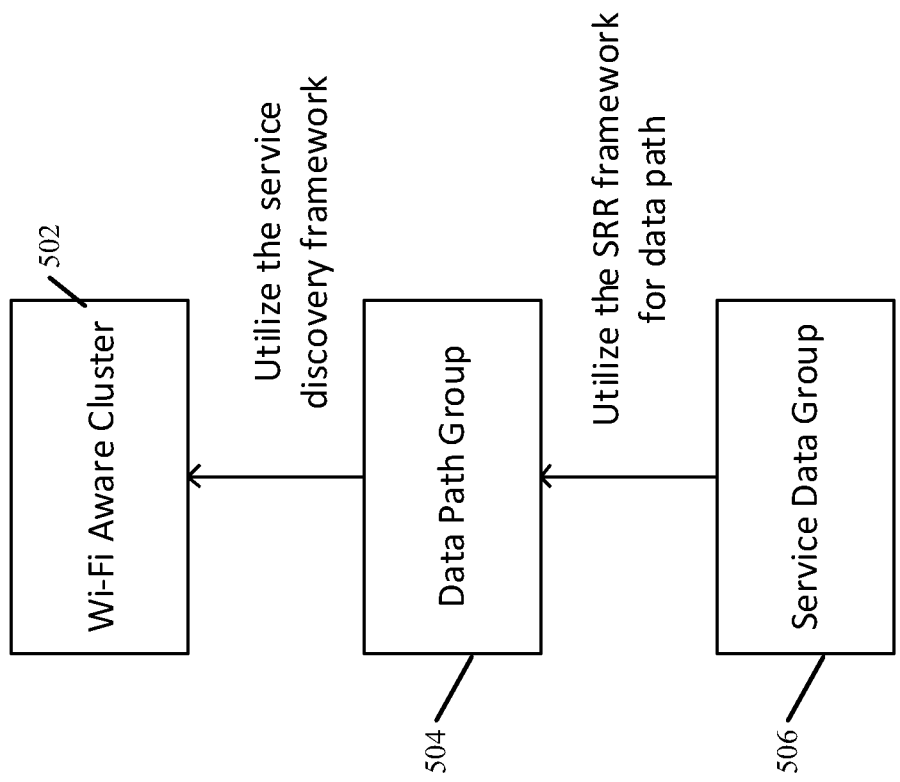
FIG. 5 is schematic illustration of relationships between a service data group, a data path group, and a cluster, in accordance with some demonstrative embodiments.

Reference is made to FIG. 5, which schematically illustrates relationships between a service data group 506, a data path group 504, and a cluster 502, in accordance with some demonstrative embodiments. For example, service data group 506 may perform the functionality of service data group 149 (FIG. 1), and/or service data group 206 (FIG. 2); data path group 504 may perform the functionality of data path group 109 (FIG. 1), and/or data path group 204 (FIG. 2); and/or cluster 502 may perform the functionality of cluster 202 (FIG. 2).

In some demonstrative embodiments, as shown in FIG. 5, devices in data path group 504 may belong to the same awareness cluster 502, e.g., Wi-Fi aware cluster, for example, in order to utilize the timing synchronization and service discovery framework of cluster 502.

In some demonstrative embodiments, devices in service data group 506 may belong to the same data path group 504, for example, to utilize the SRR of data path group 504 and/or to facilitate secure data exchange, e.g., based on a security policy of data path group 504.

In some demonstrative embodiments, the data path group 504 and/or the service data group 506 may have one or more functionalities, e.g., as described below.

In some demonstrative embodiments, devices of data path group 504 may have an available path for data transmission, e.g., SRR, defined for the devices in the data path group 504.

In some demonstrative embodiments, devices in data path group 504 may have one or more properties, e.g., as described below.

In some demonstrative embodiments, devices in data path group 504 may have a basic schedule of timing window and frequency hopping pattern.

In some demonstrative embodiments, devices in data path group 504 may have a limited number of channels for frequency hopping.

In some demonstrative embodiments, devices in data path group 504 may have additional schedules of timing window and/or frequency hopping pattern for a subset of devices in the data path group, e.g., a sub-data path group in a data path group.

In some demonstrative embodiments, devices in data path group 504 may initiate the change of the SRR.

In some demonstrative embodiments, devices that may be subscribed to a same service may be in service data group 506.

In some demonstrative embodiments, the service data group 506 may have one or more properties, e.g., as described below.

In some demonstrative embodiments, the devices in service data group 506 may have an access policy for service data transmission.

In some demonstrative embodiments, the devices in service data group 506 may have a security policy, or may not have a security policy.

In some demonstrative embodiments, the devices in service data group 506 may use broadcast, multicast, or unicast transmission, e.g., to communicate between devices of service data group 506.

In some demonstrative embodiments, the devices in service data group 506 may use multi-hop or relay transmission e.g., to communicate between devices of service data group 506.

In some demonstrative embodiments, the devices in service data group 506 may be limited to only one-hop transmission.

In some demonstrative embodiments, a plurality of service data groups 506 may be established in data path group 504.

In some demonstrative embodiments, service data group 506 and/or data path group 504 may be initiated, defined, and/or formed, for example, using one or more of the operations described below. However, the operations, e.g., as described herein, may not be limited by any mechanism to initiate the group.

In some demonstrative embodiments, service data group 506 may be created with data path group 504 simultaneously, e.g., as described above.

In one example, a device may start service data group 506 and may define an SRR for the service data group 506. Accordingly, data path group 504 may also be created, e.g., with respect to one or more devices having the defined SRR.

In some demonstrative embodiments, service data group 506 may be formed in a new data path group 504.

In some demonstrative embodiments, service data group 506 may be created in a data path group.

For example, service data group 506 may be formed in an existing data path group 504. According to this example, devices of data path group 504 may be able to form another service data group in data path group 504.

In some demonstrative embodiments, service data group 506 may be initiated by any device, e.g., wireless communication devices 102, 115, 140, 150, 160, 170 and/or 180.

In some demonstrative embodiments, using the relationship between service data group 506, data path group 504, and cluster 502, e.g., as described above, may enable efficient utilization of WM 103 (FIG. 1), and/or efficient communication between wireless communication devices, e.g., devices 102, 115, 140, 150, 160, 170 and/or 180 (FIG. 1), sharing one or more services within a data path group.

Figure 6:
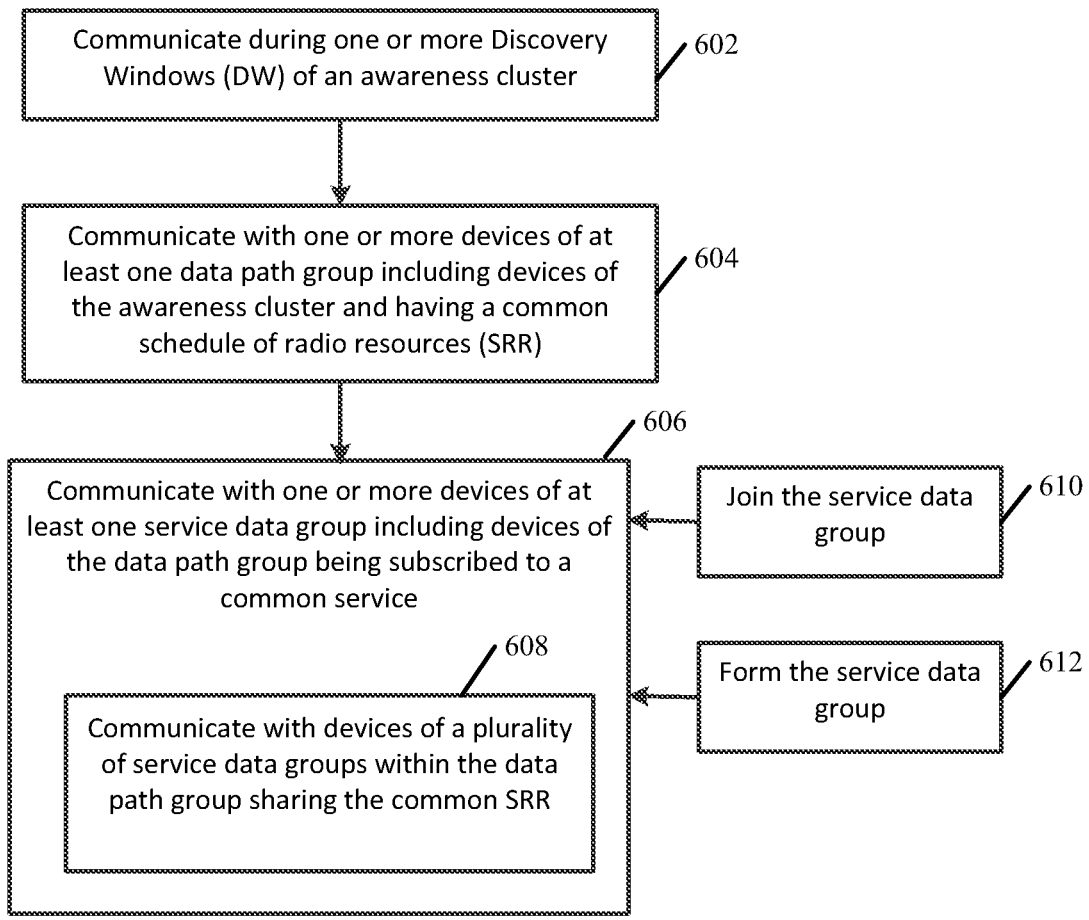
FIG. 6 is a schematic flow-chart illustration of a method of communicating in an awareness cluster, in accordance with some demonstrative embodiments.

Reference is made to FIG. 6, which schematically illustrates a method of communicating in an awareness cluster, in accordance with some demonstrative embodiments. For example, one or more of the operation of FIG. 6 may be performed by one or more elements of a system, system 100 (FIG. 1), a device, wireless communication devices 102, 115, 140, 150, 160, 170 and/or 180 (FIG. 1), a controller, e.g., controller 124 (FIG. 1); a radio, e.g., radio 114 (FIG. 1); and/or a message processor, e.g., message processor 128 (FIG. 1).

As indicated at block 602, the method may include communicating during one or more Discovery Windows (DW) of an awareness cluster. For example, device 102 (FIG. 1) may communicate during one or more DWs of the awareness cluster including wireless communication devices 102, 115, 140, 150, 160, 170 and/or 180 (FIG. 1), e.g., as described above.

As indicated at block 604, the method may include communicating with one or more devices of at least one data path group, the data path group including devices of the awareness cluster and having a common schedule of radio resources (SRR). For example, device 102 (FIG. 1) may communicate with one or more devices of data path group 109 (FIG. 1) having a common schedule SRR, e.g., as described above.

As indicated at block 606, the method may include communicating with one or more devices of at least one service data group, the service data group including devices of the data path group being subscribed to a common service. For example, device 102 (FIG. 1) may communicate with devices 140 and/or 115 (FIG. 1), e.g., of service data group 149 (FIG. 1), which may be subscribed to a service provided by application 125 (FIG. 1), e.g., as described above.

As indicated at block 608, communicating with one or more devices of at least one service data group may include communicating with devices of a plurality of service data groups within the data path group, the plurality of service data groups sharing the common SRR. For example, device 102 (FIG. 1) may communicate with devices 150 and/or 160 (FIG. 1) of service data group 169 (FIG. 1), as well as with devices 115 and/or 140 (FIG. 1) of service data group 149 (FIG. 1), e.g., sharing the common SRR of data path group 109 (FIG. 1), e.g., as described above.

As indicated at block 610, the method may include joining the service data group. For example, device 102 (FIG. 1) may join service data group 149 (FIG. 1), e.g., as described above.

As indicated at block 612, the method may include forming the service data group. For example, device 102 (FIG. 1) may form service data group 149 (FIG. 1), e.g., as described above.

Figure 7:
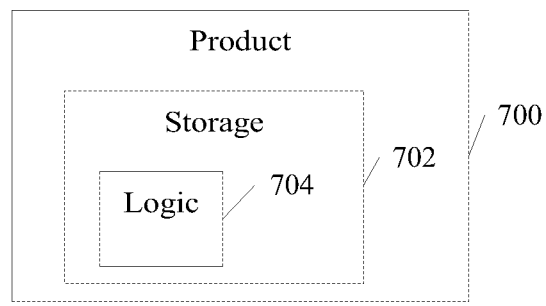
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102, 115, 140, 150, 160, 170 and/or 180 (FIG. 1), radio 114 (FIG. 1), transmitter 118 (FIG. 1), receiver 116 (FIG. 1), controller 124, message processor 128 (FIG. 1), and/or to perform one or more operations and/or functionalities of the FIGS. 2, 3, 4, 5, and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause an awareness networking device to communicate during one or more Discovery Windows (DW) of an awareness cluster; communicate with one or more devices of at least one data path group, the data path group comprising devices of the awareness cluster and having a common schedule of radio resources (SRR); and communicate with one or more devices of at least one service data group, the service data group comprising devices of the data path group being subscribed to a common service.

Example 2 includes the subject matter of Example 1, and optionally, being configured to cause the awareness networking device to communicate with devices of a plurality of service data groups within the data path group, the plurality of service data groups sharing the common SRR.

Example 3 includes the subject matter of Example 1 or 2, and optionally, being configured to cause the awareness networking device to communicate with devices of a plurality of data path groups belonging to the awareness cluster.

Example 4 includes the subject matter of any one of Examples 1-3, and optionally, being configured to cause the awareness networking device to join the service data group.

Example 5 includes the subject matter of any one of Examples 1-4, and optionally, being configured to cause the awareness networking device to form the service data group.

Example 6 includes the subject matter of Example 5, and optionally, being configured to cause the awareness networking device to form a data path group comprising the service data group.

Example 7 includes the subject matter of Example 5, and optionally, being configured to cause the awareness networking device to form the service data group in an existing data path group.

Example 8 includes the subject matter of any one of Examples 1-7, and optionally, wherein the SRR comprises timing and channel resources.

Example 9 includes the subject matter of any one of Examples 1-8, and optionally, being configured to cause the awareness networking device to communicate with the devices of the service data group according to a security policy.

Example 10 includes the subject matter of any one of Examples 1-9, and optionally, being configured to cause the awareness networking device to communicate with the devices of the service data group according to an access policy.

Example 11 includes the subject matter of any one of Examples 1-10, and optionally, wherein the awareness networking device comprises a Neighbor Awareness Networking (NAN) device, and wherein the awareness cluster comprises a NAN cluster.

Example 12 includes the subject matter of any one of Examples 1-11, and optionally, comprising a radio, one or more antennas, a memory, and a processor.

Example 13 includes a system comprising an awareness networking device, the awareness networking device comprising one or more antennas; a memory; a processor; and a radio to communicate during one or more Discovery Windows (DW) of an awareness cluster; to communicate with one or more devices of at least one data path group, the data path group comprising devices of the awareness cluster and having a common schedule of radio resources (SRR); and to communicate with one or more devices of at least one service data group, the service data group comprising devices of the data path group being subscribed to a common service.

Example 14 includes the subject matter of Example 13, and optionally, wherein the awareness networking device is to communicate with devices of a plurality of service data groups within the data path group, the plurality of service data groups sharing the common SRR.

Example 15 includes the subject matter of Example 13 or 14, and optionally, wherein the awareness networking device is to communicate with devices of a plurality of data path groups belonging to the awareness cluster.

Example 16 includes the subject matter of any one of Examples 13-15, and optionally, wherein the awareness networking device is to join the service data group.

Example 17 includes the subject matter of any one of Examples 13-16, and optionally, wherein the awareness networking device is to form the service data group.

Example 18 includes the subject matter of Example 17, and optionally, wherein the awareness networking device is to form a data path group comprising the service data group.

Example 19 includes the subject matter of Example 17, and optionally, wherein the awareness networking device is to form the service data group in an existing data path group.

Example 20 includes the subject matter of any one of Examples 13-19, and optionally, wherein the SRR comprises timing and channel resources.

Example 21 includes the subject matter of any one of Examples 13-20, and optionally, wherein the awareness networking device is to communicate with the devices of the service data group according to a security policy.

Example 22 includes the subject matter of any one of Examples 13-21, and optionally, wherein the awareness networking device is to communicate with the devices of the service data group according to an access policy.

Example 23 includes the subject matter of any one of Examples 13-22, and optionally, wherein the awareness networking device comprises a Neighbor Awareness Networking (NAN) device, and wherein the awareness cluster comprises a NAN cluster.

Example 24 includes a method to be performed at an awareness networking device, the method comprising communicating during one or more Discovery Windows (DW) of an awareness cluster; communicating with one or more devices of at least one data path group, the data path group comprising devices of the awareness cluster and having a common schedule of radio resources (SRR); and communicating with one or more devices of at least one service data group, the service data group comprising devices of the data path group being subscribed to a common service.

Example 25 includes the subject matter of Example 24, and optionally, comprising communicating with devices of a plurality of service data groups within the data path group, the plurality of service data groups sharing the common SRR.

Example 26 includes the subject matter of Example 24 or 25, and optionally, comprising communicating with devices of a plurality of data path groups belonging to the awareness cluster.

Example 27 includes the subject matter of any one of Examples 24-26, and optionally, comprising joining the service data group.

Example 28 includes the subject matter of any one of Examples 24-27, and optionally, comprising forming the service data group.

Example 29 includes the subject matter of Example 28, and optionally, comprising forming a data path group comprising the service data group.

Example 30 includes the subject matter of Example 28, and optionally, comprising forming the service data group in an existing data path group.

Example 31 includes the subject matter of any one of Examples 24-30, and optionally, wherein the SRR comprises timing and channel resources.

Example 32 includes the subject matter of any one of Examples 24-31, and optionally, comprising communicating with the devices of the service data group according to a security policy.

Example 33 includes the subject matter of any one of Examples 24-32, and optionally, comprising communicating with the devices of the service data group according to an access policy.

Example 34 includes the subject matter of any one of Examples 24-33, and optionally, wherein the awareness networking device comprises a Neighbor Awareness Networking (NAN) device, and wherein the awareness cluster comprises a NAN cluster.

Example 35 includes a product comprising one or more tangible computer-readable non-transitory storage media comprising computer-executable instructions operable to, when executed by at least one computer processor, enable the at least one computer processor to implement one or more operations at an awareness networking device, the operations comprising communicating during one or more Discovery Windows (DW) of an awareness cluster; communicating with one or more devices of at least one data path group, the data path group comprising devices of the awareness cluster and having a common schedule of radio resources (SRR); and communicating with one or more devices of at least one service data group, the service data group comprising devices of the data path group being subscribed to a common service.

Example 36 includes the subject matter of Example 35, and optionally, wherein the operations comprise communicating with devices of a plurality of service data groups within the data path group, the plurality of service data groups sharing the common SRR.

Example 37 includes the subject matter of Example 35 or 36, and optionally, wherein the operations comprise communicating with devices of a plurality of data path groups belonging to the awareness cluster.

Example 38 includes the subject matter of any one of Examples 35-37, and optionally, wherein the operations comprise joining the service data group.

Example 39 includes the subject matter of any one of Examples 35-38, and optionally, wherein the operations comprise forming the service data group.

Example 40 includes the subject matter of Example 39, and optionally, wherein the operations comprise forming a data path group comprising the service data group.

Example 41 includes the subject matter of Example 39, and optionally, wherein the operations comprise forming the service data group in an existing data path group.

Example 42 includes the subject matter of any one of Examples 35-41, and optionally, wherein the SRR comprises timing and channel resources.

Example 43 includes the subject matter of any one of Examples 35-42, and optionally, wherein the operations comprise communicating with the devices of the service data group according to a security policy.

Example 44 includes the subject matter of any one of Examples 35-43, and optionally, wherein the operations comprise communicating with the devices of the service data group according to an access policy.

Example 45 includes the subject matter of any one of Examples 35-44, and optionally, wherein the awareness networking device comprises a Neighbor Awareness Networking (NAN) device, and wherein the awareness cluster comprises a NAN cluster.

Example 46 includes an apparatus of wireless communication by an awareness networking device, the apparatus comprising means for communicating during one or more Discovery Windows (DW) of an awareness cluster; means for communicating with one or more devices of at least one data path group, the data path group comprising devices of the awareness cluster and having a common schedule of radio resources (SRR); and means for communicating with one or more devices of at least one service data group, the service data group comprising devices of the data path group being subscribed to a common service.

Example 47 includes the subject matter of Example 46, and optionally, comprising means for communicating with devices of a plurality of service data groups within the data path group, the plurality of service data groups sharing the common SRR.

Example 48 includes the subject matter of Example 46 or 47, and optionally, comprising means for communicating with devices of a plurality of data path groups belonging to the awareness cluster.

Example 49 includes the subject matter of any one of Examples 46-48, and optionally, comprising means for joining the service data group.

Example 50 includes the subject matter of any one of Examples 46-49, and optionally, comprising means for forming the service data group.

Example 51 includes the subject matter of Example 50, and optionally, comprising means for forming a data path group comprising the service data group.

Example 52 includes the subject matter of Example 50, and optionally, comprising means for forming the service data group in an existing data path group.

Example 53 includes the subject matter of any one of Examples 46-52, and optionally, wherein the SRR comprises timing and channel resources.

Example 54 includes the subject matter of any one of Examples 46-53, and optionally, comprising means for communicating with the devices of the service data group according to a security policy.

Example 55 includes the subject matter of any one of Examples 46-54, and optionally, comprising means for communicating with the devices of the service data group according to an access policy.

Example 56 includes the subject matter of any one of Examples 46-55, and optionally, wherein the awareness networking device comprises a Neighbor Awareness Networking (NAN) device, and wherein the awareness cluster comprises a NAN cluster.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a memory; and
   a processor configured to cause a first Neighbor Awareness Networking (NAN) device to:
   communicate one or more NAN Service Discovery Frames (SDFs) during one or more Discovery Windows (DWs) of a NAN cluster, the NAN cluster comprising a plurality of NAN devices sharing a common timing of the DWs; and
   communicate data with a second NAN device according to a common schedule of resources shared by a NAN data group in said NAN cluster, the NAN data group comprising at least the first and second NAN devices.

2. The apparatus of claim 1 configured to cause the first NAN device to communicate the data with the second NAN device according to a first common schedule of resources shared by a first NAN data group in said NAN cluster, and to communicate data with a third NAN device according to a second common schedule of resources shared by a second NAN data group in said NAN cluster, the second NAN data group comprising at least the first and third NAN devices.

3. The apparatus of claim 2, wherein the first common schedule of resources is different from the second common schedule of resources.

4. The apparatus of claim 1 configured to cause the first NAN device to communicate data with a third NAN device according to the common schedule of resources shared by the NAN data group, the NAN data group comprising at least the first, second and third NAN devices.

5. The apparatus of claim 1 configured to cause the first NAN device to form the NAN data group.

6. The apparatus of claim 1 configured to cause the first NAN device to communicate the data with the second NAN device in a unicast communication.

7. The apparatus of claim 1 configured to cause the first NAN device to establish a link to communicate the data with the second NAN device according to the common schedule of resources.

8. The apparatus of claim 1, wherein the plurality of NAN devices in the NAN cluster share a common Time Synchronization function (TSF).

9. The apparatus of claim 1, wherein the common schedule of resources comprises one or more time slots over one or more channels.

10. The apparatus of claim 1, wherein the common schedule of resources comprises one or more first time slots over a first channel and one or more second time slots over a second channel.

11. The apparatus of claim 1 comprising a radio.

12. The apparatus of claim 1 comprising one or more antennas.

13. A product comprising one or more tangible computer-readable non-transitory storage media comprising computer-executable instructions operable to, when executed by at least one processor, enable the at least one processor to cause a first Neighbor Awareness Networking (NAN) device to:
   communicate one or more NAN Service Discovery Frames (SDFs) during one or more Discovery Windows (DWs) of a NAN cluster, the NAN cluster comprising a plurality of NAN devices sharing a common timing of the DWs; and
   communicate data with a second NAN device according to a common schedule of resources shared by a NAN data group in said NAN cluster, the NAN data group comprising at least the first and second NAN devices.

14. The product of claim 13, wherein the instructions, when executed, cause the first NAN device to communicate the data with the second NAN device according to a first common schedule of resources shared by a first NAN data group in said NAN cluster, and to communicate data with a third NAN device according to a second common schedule of resources shared by a second NAN data group in said NAN cluster, the second NAN data group comprising at least the first and third NAN devices.

15. The product of claim 14, wherein the first common schedule of resources is different from the second common schedule of resources.

16. The product of claim 13, wherein the instructions, when executed, cause the first NAN device to communicate data with a third NAN device according to the common schedule of resources shared by the NAN data group, the NAN data group comprising at least the first, second and third NAN devices.

17. The product of claim 13, wherein the instructions, when executed, cause the first NAN device to form the NAN data group.

18. The product of claim 13, wherein the instructions, when executed, cause the first NAN device to communicate the data with the second NAN device in a unicast communication.

19. The product of claim 13, wherein the instructions, when executed, cause the first NAN device to establish a link to communicate the data with the second NAN device according to the common schedule of resources.

20. The product of claim 13, wherein the plurality of NAN devices in the NAN cluster share a common Time Synchronization function (TSF).

21. The product of claim 13, wherein the common schedule of resources comprises one or more time slots over one or more channels.

22. The product of claim 13, wherein the common schedule of resources comprises one or more first time slots over a first channel and one or more second time slots over a second channel.

23. An apparatus comprising:
  means for causing a first Neighbor Awareness Networking (NAN) device to communicate one or more NAN Service Discovery Frames (SDFs) during one or more Discovery Windows (DWs) of a NAN cluster, the NAN cluster comprising a plurality of NAN devices sharing a common timing of the DWs; and
  means for causing the first NAN device to communicate data with a second NAN device according to a common schedule of resources shared by a NAN data group in said NAN cluster, the NAN data group comprising at least the first and second NAN devices.

24. The apparatus of claim 23 comprising means for causing the first NAN device to communicate the data with the second NAN device according to a first common schedule of resources shared by a first NAN data group in said NAN cluster, and to communicate data with a third NAN device according to a second common schedule of resources shared by a second NAN data group in said NAN cluster, the second NAN data group comprising at least the first and third NAN devices.

25. The apparatus of claim 23 comprising means for causing the first NAN device to communicate data with a third NAN device according to the common schedule of resources shared by the NAN data group, the NAN data group comprising at least the first, second and third NAN devices.

* * * * *